Dec. 28, 1965 C. A. MENELEY 3,226,058
DOUBLE MAP NAVIGATIONAL CONTROL SYSTEM FOR AIRCRAFT
Filed June 30, 1951 2 Sheets-Sheet 1
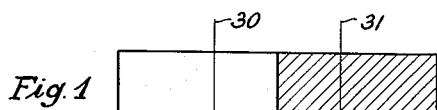
Fig. 1
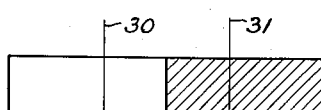
Fig. 5
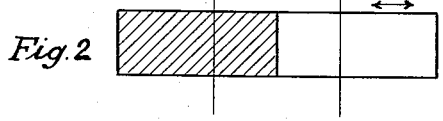
Fig. 2
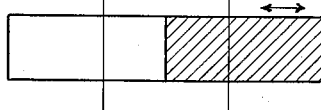
Fig. 6
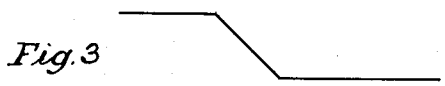
Fig. 3
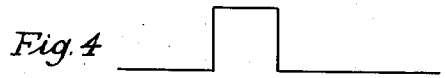
Fig. 7
Fig. 4
Fig. 8
Fig. 9
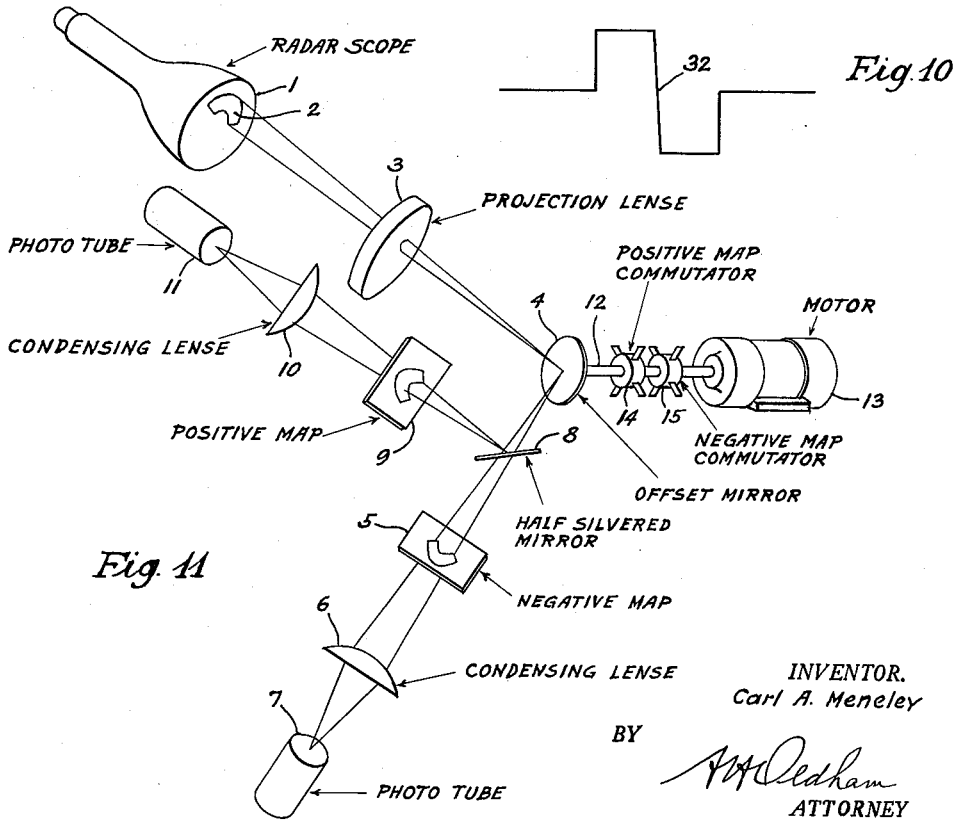
Fig. 10
Fig. 11
INVENTOR.
Carl A. Meneley
BY
ATTORNEY Dec. 28, 1965 C. A. MENELEY 3,226,058
DOUBLE MAP NAVIGATIONAL CONTROL SYSTEM FOR AIRCRAFT
Filed June 30, 1951 2 Sheets-Sheet 2

INVENTOR.
Carl A. Meneley
BY
H. H. Oldham
ATTORNEY

United States Patent Office 3,226,058
Patented Dec. 28, 1965

3,226,058
DOUBLE MAP NAVIGATIONAL CONTROL
SYSTEM FOR AIRCRAFT
Carl A. Meneley, 2340 19th St., Cuyahoga Falls, Ohio
Filed June 30, 1951, Ser. No. 234,602
10 Claims. (Cl. 244—14)

This invention relates to apparatus for guiding and/or indicating the position of aircraft or the like and, more particularly, is concerned with apparatus associated with the aircraft for indicating or controlling the flight path of aircraft over areas where large land-water boundaries exist.

It has been proposed heretofore in the patent application of Meneley and Langworthy, Serial No. 66,048, filed December 18, 1948, to provide guidance for a pilotless aircraft or the like by the automatic comparison of a radar display image of the terrain over which the aircraft is flying with stored reference information in the form of an opposite contrast reference map transparency having substantially the same scale and orientation as the radar display image. While the apparatus descibed in the above-identified application is effective in indicating or controlling the position of the aircraft over land terrain that has considerable variation in detail, difficulty is sometimes encountered in cases where the map contains a large land-water boundary, or any other terrain features which cause the contrast map to consist of two areas, one essentially light and one essentially dark.

It is the general object of this invention to improve upon prior art practices by the provision of an apparatus for automatically indicating or controlling the flight path of aircraft over terrain which is entirely or partially void of contrasting detail except for a division into a dark and a light area, such as exists at a land-water boundary.

Another object of this invention is to provide navigational apparatus in which two reference maps, one a negative and one a positive, of the terrain are compared simultaneously with a radar display image of the terrain over which the aircraft is flying.

Another object of this invention is to provide a means for producing the proper transmission versus displacement function for determining a match position between the radar display image and the previously prepared maps.

The foregoing and other objects of the invention which will become apparent as the description proceeds are achieved, first, by providing means, such as a radar screen, for producing a substantially instantaneous image of the terrain over which the aircraft is flying. The image of the radar display is split into two images by a half-silvered mirror, each image being projected on the plane of the previously prepared maps of the terrain over which the course of the aircraft passes. The maps are of opposite contrast, one a negative and one a positive, and they are moved simultaneously by motor means in a plane transversely of the light path of the projected images. Means, such as a rotating mirror, is provided for effecting a nutation of the projected images in the plane of the maps, and such means is interposed between the radar screen and the half-silvered mirror. Photocells are positioned behind each map. The output signals of the photocells are independently commutated simultaneously and synchronously with the nutational movement of the projected display images whereby the error signals derived across opposite segments of the commutators are given a directional sense. The error signals derived from one of the commutators are applied to inverting networks and then added to the error signals derived from the other commutator and applied to motor control means associated with the map-positioning motors. The map-positioning motors are thus controlled to move the maps relative to the radar display image to reduce the error signals derived from the photocells and commutators substantially to zero to maintain a match between the maps and radar display image.

For a better understanding of the invention, reference should be had to the accompanying drawings, wherein:

FIGURES 1 through 10 are graphic representations of the idealized characteristics of the system;

FIG. 11 is a diagrammatic perspective view of the mechanical optical apparatus incorporated in the invention;

It will be understood that the present invention provides apparatus for scanning a radar image over a portion of two previously prepared maps and the development of lateral and longitudinal error signals, and provides apparatus for using these error signals for aligning the two maps with the radar image, the relative alignment providing guidance for the aircraft along a planned flight path.

Figure 12:
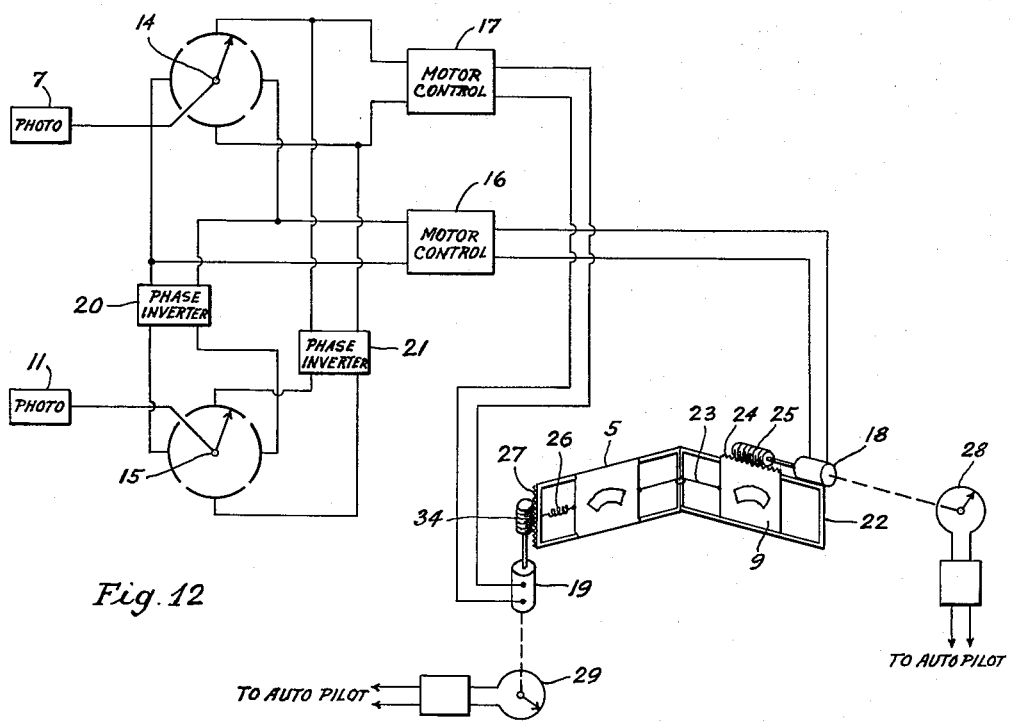
FIG. 12 is a combined diagrammatic and schematic illustration of the apparatus of the invention which utilizes the matching of the map and the radar image to indicate or control the flight path of the aircraft.

With specific reference to the form of the invention illustrated in FIGURES 11 and 12, the numeral 1 indicates a plan position indicator (PPI) radar tube for producing a substantially instantaneous radar display of the terrain over which the aircraft is flying. An image of the radar display 2 appearing on the screen of the radar scope 1 is directed by a lens 3 against a mirror 4 from which it is reflected to a reference map 5. The map 5 may be made from actual radar photographs obtained by flying a similar radar over the area before the controlled aircraft flight, or may be made by other methods, such as utilization of an ultrasonic radar trainer operating over a built-up model of the terrain over which the aircraft is to fly. The map 5 covers a larger area than that presented by the radar display tube and is usually in the form of a transparency.

The light from the projected display image passes through the map 5 and is directed through a condensing lens 6 onto a photocell or other light-sensitive means 7. It will be understood that suitable amplifier means are usually incorporated with the photocell 7 to amplify the output signal of the photocell to a usable level.

A half-silvered mirror 8 is interposed in the light path of the projected display image between the mirror 4 and the map 5 for deriving a second image from the radar display 2. The image reflected by the half-silvered mirror 8 is directed through a second map 9 and focused by means of a condensing lens 10 on a second photocell 11. The map 9 is of opposite contrast to the map 5. Thus, if the map 5 is the negative of the radar display 2, the map 9 is a positive, or vice versa.

The mirror 4 is mounted on a shaft 12 of a motor 13, the plane of the mirror being tipped slightly from the perpendicular with respect to the axis of the rotating shaft of the motor. This imparts a wobble to the plane of the mirror as it is rotated by the motor, which in turn causes the reflected image to scan in a small circular motion in the plane of the reference maps 5 and 9. This systematic scanning movement between the display image and the reference map, hereinafter referred to as nutation of the display image, is an essential feature of the navigational system in maintaining a match between the reference maps and the radar display image by introducing a directional sense to any displacement error therebetween.

Associated with the motor shaft 12 are the commutators 14 and 15. The commutators 14 and 15 preferably have four segments each which are successively connected to the output of the phototubes 7 and 11 respectively.

Opposed segments of the commutator 14 are connected to a right-left motor control circuit indicated generally at 16 and the remaining two opposed segments are connected to a fore-aft motor control circuit, indicated generally at 17, "fore-aft" and "right-left" referring to the movement of the maps relative to the desired course of the aircraft. (The desired course of the aircraft is preferably from bottom to top across the center of the reference map.) Thus, the amplified output of the photocell 7 is commutated synchronously with the nutation of the projected radar image as effected by the rotating mirror 4 into fore-aft and right-left components. The motor control circuits 16 and 17 are responsive to difference in potential on the opposed segments of the commutator, this difference in potential being in effect an error signal indicative of the mismatch between the projected radar image and the reference match in either the fore-aft or the right-left direction. The motor control circuits 16 and 17 are connected to motors 18 and 19 respectively, which move the reference maps 5 and 9, in a manner hereinafter described, to reduce the error voltage developed across opposed segments of the commutators to zero.

Opposed segments of the commutator 15 are connected respectively to the phase-inverting amplifiers 20 and 21, the inverted signal derived therefrom being added to the signal from the corresponding segments of the commutator 14.

The reference maps 5 and 9 are mounted at an angle so as to intercept the images of the radar display as derived from the half-silvered mirror 8. The two maps are mounted for universal movement in a plane transversely to the light path of the projected images. Any suitable means may be employed to effect simultaneous movement of the two reference maps in a lateral or vertical movement relative to the projected images of the radar display. One such suitable mechanism is shown diagrammatically in FIG. 12, in which the maps 5 and 9 are slidably carried for general movement in a frame indicated generally at 22. The two maps are joined by a flexible wire or like tension member 23. Movement of the map 9 is effected by the motor 18 by means of a worm rack 24 along one edge of the map 9, the rack engaging a worm 25 driven by the motor 18. The map 5 is moved simultaneously with the map 9 by means of the flexible tension member 23, which is maintained in tension by the tension spring 26.

The maps 5 and 9 are moved simultaneously in a vertical or fore-aft movement by means of a worm rack 27 associated with the frame 22 which engages a worm 34 driven from the shaft of the motor 19. Thus, rotation of the motors 18 and 19 results in simultaneous movement of the reference maps 5 and 9 in the lateral or right-left direction and the vertical or fore-aft direction.

Potentiometers 28 and 29 are coupled to the motors 18 and 19. A signal representative of the relative position of the maps 5 and 9 in either the fore-aft or right-left direction is derived from the potentiometers 28 and 29. This information is applied to the auotpilot (not shown) to control or indicate the flight path of the aircraft.

Operation of the invention can best be understood by reference to FIGURES 1 through 10, in which FIG. 1 shows the positive radar display, in idealized representation, as it would appear on the radar screen. Assuming that the aircraft is flying along a coast line, for example, the radar display is essentially divided into two areas of different contrast, one area corresponding to the land mass, and the other area corresponding to the water area. FIG. 2 shows the negative reference map of the same area. As the negative reference map is moved laterally to the left relative to the radar display image from the relative match position as illustrated, the area of the reference map exposed to the photocell being confined to the area between the two vertical lines 30 and 31 which represent the edges of a mask moving with the map, the light falling on the photocell will increase continuously until the maximum light area of the display is exposed to the photocell through the light area of the map. Movement of the reference map to the right results only in overlap of the dense portions of the image and negative reference map which, it is evident, does not change the level of light falling on the photocell. The variation in light falling on the photocell as a function of displacement of the map and mask relative to the radar display is indicated by the curve in FIG. 3. The error signal appearing across the "right-left" pair of opposed segments of the commutator 14 is indicated by the curve in FIG. 4 and is effectively the derivative of the curve in FIG. 3.

FIG. 5 is the same as FIG. 1, showing an idealized radar display. FIG. 6 shows the positive reference map of the same area. As the reference map, together with the mask indicated by the line 30 and 31, is moved relative to the display image, the light received by the phototube 11 varies as indicated in the curve of FIG. 7. The error voltage appearing across the "right-left" pair of opposed segments of the commutator 15 is shown by the curve in FIG. 8, which is the derivative of the curve of FIG. 7. The error signal is inverted, as indicated in FIG. 9, and added to the error signal as indicated by the curve in FIG. 4. The resulting signal has a curve as indicated in FIG. 10. The resulting signal, when applied to the right-left motor control circuit 16, actuates the motor 18 in such a manner as to match the map and the radar display image to maintain the signal applied to the motor control circuit at zero, as indicated at the point 32 in the curve of FIG. 10.

Figure 13:
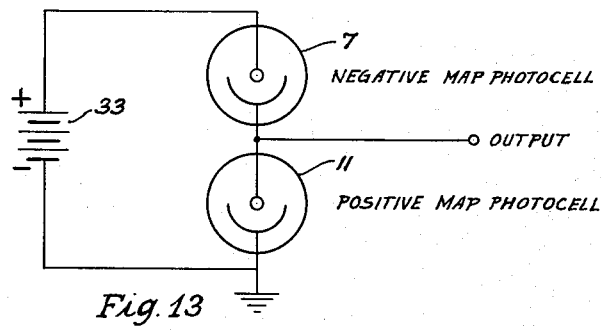
FIG. 13 is a schematic diagram of an alternative photocell circuit.

An alternative form of the invention is illustrated in FIG. 13, in which the photocells 7 and 11 are connected in series across their source of voltage 33. Output from the photocell circuit is taken from a connection at the common junction of the two photocells. In this configuration, each photocell acts as a load resistor for the other.

Figure 14:
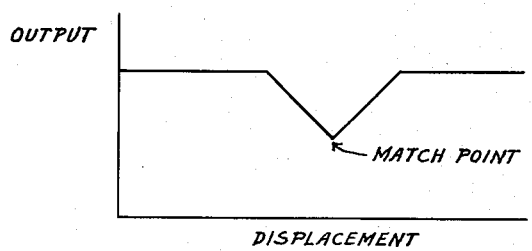
FIG. 14 is a graphical representation of the idealized signal characteristics derived from the circuit of FIG. 13.

Operation of the circuit of FIG. 13 can best be understood by again referring to FIGURES 1 through 10. As the reference map of FIG. 2 moves to the right relative to the display image of FIG. 1, the light decreases, as shown in FIG. 3, until the match point is reached. At the same time, the light through the positive map as shown in FIG. 6 remains constant. For this part of the scan, the positive map phototube 11 acts as a constant value resistor and the negative map phototube 7 acts as a resistor whose value is increasing as a function of displacement. During this interval, the output terminal becomes more negative and reaches its minimum value at the match point. As the reference map of FIG. 2 is moved farther to the right, past the match position, the negative map phototube 7 becomes a constant value resistor since the light falling on it remains at a constant minimum value, and the positive map phototube 11 acts as a resistor which increases as a function of displacement, causing the output terminals to again become more positive. The resulting output versus displacement curve is shown in FIG. 14, which is the desired static characteristic.

The output signal of the configuration of FIG. 13 is taken across the photocell 11 and commutated in the usual manner and the resulting error signal applied to the motor control circuits 16 and 17.

From the above description, it will be appreciated that the objects of the invention have been achieved by the provision of an apparatus which gives improved matching data where the flight of the aircraft is along a large land-water boundary. The system described is an improvement upon the single match system which is limited to operation over terrain which has considerable contrasting detail.

While certain representative embodiments and details have been shown for the purpose of illustrating the invention, it will be apparent to those skilled in this art that various changes and modifications may be made therein without departing from the spirit or scope of the invention.

I claim:

1. In an apparatus for controlling the flight of an aircraft along a land-water boundary, means for producing a substantially instantaneous image of the terrain over which the aircraft is flying, a negative contrast reference map and a positive contrast reference map of the terrain to be navigated, said maps and image having substantially the same scale and orientation, means for projecting the image of the terrain onto each of the maps, motor means for simultaneously moving each map transversely of the light path of the image projected onto the map, light sensitive means associated with each map for measuring the variation in light as the map is moved relative to the projected image, error measuring means associated with each of said light sensitive means for producing an error voltage indicative of the relative displacement of the map and the projected image from a match condition, signal inverting means associated with the output of one of the error measuring means, the output of the signal inverting means being added to the output signal of the other of said error measuring means, motor control means responsive to the resulting composite signal and associated with the said motor means for moving each map to effect a match between the map and the projected image and reduce the resulting error signal to zero, and means responsive to the position of each reference map when matched with the projected image of the terrain for controlling the flight of the aircraft.

2. In an apparatus for controlling the flight of an aircraft along a land-water boundary, means for producing a substantially instantaneous image of the terrain over which the aircraft is flying, a negative contrast reference map and a positive contrast reference map of the terrain to be navigated, said maps and image having substantially the same scale and orientation, means for projecting the image of the terrain onto each of the maps, motor means for simultaneously moving each map transversely of the light path of the image projected onto the map, light sensitive means associated with each map for measuring the variation in light as the map is moved relative to the projected image, error measuring means associated with each of said light sensitive means for producing an error voltage indicative of the relative displacement of the map and the projected image from a match condition, signal inverting means associated with the output of one of the error measuring means, the output of the signal inverting means being added to the output signal of the other of said error measuring means, and motor control means responsive to the resulting composite signal and associated with the said motor means for moving each map to effect a match between the maps and the projected image and reduce the resulting error signal to zero.

3. In an apparatus for controlling the flight of an aircraft along a land-water boundary, means for producing a substantially instantaneous image of the terrain over which the aircraft is flying, a negative contrast reference map and a positive contrast reference map of the terrain to be navigated, said maps and image having substantially the same scale and orientation, means for projecting the image of the terrain onto each of the maps, motor means for simultaneously moving each map transversely of the light path of the image projected onto the map, light sensitive means associated with each map for measuring the variation in light as the map is moved relative to the projected image, said light sensitive means being electrically connected in series across a source of D.C. voltage, error measuring means for producing an error signal indicative of the relative displacement from a match position of each map and its projected image, said error measuring means being responsive to the voltage across the light sensitive means associated with the positive contrast reference map, motor control means responsive to the resulting signal and associated with the said motor means for moving each map to effect a match between the map and the projected image and reduce the resulting error signal to zero, and means responsive to the position of each reference map when matched with the projected image of the terrain for controlling the flight of the aircraft.

4. In an apparatus for controlling the flight of an aircraft along a land-water boundary, means for producing a substantially instantaneous image of the terrain over which the aircraft is flying, a negative contrast reference map and a positive contrast reference map of the terrain to be navigated, said maps and image having substantially the same scale and orientation, means for projecting the image of the terrain onto each of the maps, motor means for simultaneously moving each map transversely of the light path of the image projected onto the map, light sensitive means associated with each map for measuring the variation in light as the map is moved relative to the projected image, said light sensitive means being electrically connected in series across a source of D.C. voltage, error measuring means for producing an error signal indicative of the relative displacement from a match position of each map and its projected image, said error measuring means being responsive to the voltage across the light sensitive means associated with the positive contrast reference map, and motor control means responsive to the resulting signal and associated with the said motor means for moving each map to effect a match between the map and the projected image and reduce the resulting error signal to zero.

5. In an apparatus for controlling the flight of an aircraft along a land-water boundary, means for producing a substantially instantaneous image of the terrain over which the aircraft is flying, a negative contrast reference map and a positive contrast reference map of the terrain to be navigated, said maps and image having substantially the same scale and orientation, means for projecting the image of the terrain onto each of the maps, motor means for simultaneously moving each map transversely of the light path of the image projected onto the map, light sensitive means associated with each map for measuring the variation in light as the map is moved relative to the projected image, means responsive to the variations in the output signals of the light sensitive means for producing an error signal indicative of the displacement from a match condition of the map and projected image, motor control means responsive to the resulting signal and associated with the said motor means for moving each map to effect a match between the map and the projected image and reduce the resulting error signal to zero, and means responsive to the position of each reference map when matched with the projected image of the terrain for controlling the flight of the aircraft.

6. In an apparatus for controlling the flight of an aircraft along a land-water boundary, means for producing a substantially instantaneous image of the terrain over which the aircraft is flying, a negative contrast reference map and a positive contrast reference map of the terrain to be navigated, said maps and image having substantially the same scale and orientation, means for projecting the image of the terrain onto each of the maps, motor means for simultaneously moving each map transversely of the light path of the image propected onto the map, light sensitive means associated with each map for measuring the variation in light as the map is moved relative to the projected image, means responsive to the variations in the output signals of the light sensitive means for producing an error signal indicative of the displacement from a match condition of the map and projected image, and motor control means responsive to the resulting signal and associated with the said motor means for moving each map to effect a match between the map and the projected image and reduce the resulting error signal to zero.

7. In an apparatus for controlling the flight of an aircraft along a land-water boundary, means for producing a substantially instantaneous image of the terrain over which the aircraft is flying, a negative contrast reference map and a positive contrast reference map of the terrain to be navigated, said maps and image having substantially the same scale and orientation, means for projecting the image of the terrain onto each of the maps, means for simultaneously moving each map transversely of the light path of the image projected onto the map, light sensitive means associated with each map for measuring the variation in light as the map is moved relative to the projected image, and control means for actuating said map-moving means to reposition the maps to effect and maintain a match with the projected images in response to the variation in light falling on the light sensitive means.

8. Automatic terrain recognition and navigation apparatus for an aircraft body or the like including means for producing substantially continuously an image of the terrain over which the body is passing, a previously prepared negative map transparency of the terrain, a previously prepared positive map transparency of the terrain and separately positioned from the negative map transparency, means splitting the image into two identical images and for superimposing one image over the negative map transparency and one image over the positive map transparency, the image and the transparency as superimposed having substantially the same scale and orientation, means for effecting a scanning movement between each transparency and its image, means responsive to substantially a match between each transparency and its image, means dependent upon the match responsive means for effecting relative repositioning movement between each transparency and its image, and means adapted to change the direction of movement of the body and responsive to the movement of repositioning means.

9. Automatic terrain recognition and navigation apparatus for an aircraft body or the like including means for producing substantially continuously a pair of images of the terrain over which the body is passing, a previously prepared negative map transparency of the terrain, a previously prepared positive map transparency of the terrain and separately positioned from the negative map transparency, means for superimposing one image over the negative map transparency and one image over the positive map transparency, the image and the transparency as superimposed having substantially the same scale and orientation, means for effecting a scanning movement between each transparency and its image, means responsive to substantially a match between each transparency and its image, means for effecting relative repositioning movement between each transparency and its image, and means adapted to change the movement of the body and responsive to the movement of repositioning means.

10. Automatic terrain recognition and navigation apparatus for an aircraft body or the like including means for producing substantially continuously a pair of images of the terrain over which the body is passing, a previously prepared negative map transparency of the terrain, a previously prepared positive map transparency of the terrain and separately positioned from the negative map transparency, means for superimposing one image over the negative map transparency and one image over the positive map transparency, the image and the transparency as superimposed having substantially the same scale and orientation, means for effecting a scanning movement between each transparency and its image, means responsive to substantially a match between each transparency and its image, and means for effecting relative repositioning movement between each transparency and its image.

No references cited.

BENJAMIN A. BORCHELT, *Primary Examiner.*
NORMAN H. EVANS, *Examiner.*